(12) United States Patent
Saragih et al.

(10) Patent No.: US 11,062,502 B2
(45) Date of Patent: Jul. 13, 2021

(54) THREE-DIMENSIONAL MODELING VOLUME FOR RENDERING IMAGES

(71) Applicant: Facebook Technologies, LLC, Menlo Park, CA (US)

(72) Inventors: Jason Saragih, Pittsburgh, PA (US); Stephen Anthony Lombardi, Pittsburgh, PA (US); Tomas Simon Kreuz, Pittsburgh, PA (US); Gabriel Bailowitz Schwartz, Pittsburgh, PA (US)

(73) Assignee: Facebook Technologies, LLC, Menlo Park, CA (US)

( * ) Notice: Subject to any disclaimer, the term of this patent is extended or adjusted under 35 U.S.C. 154(b) by 13 days.

(21) Appl. No.: 16/379,615

(22) Filed: Apr. 9, 2019

(65) Prior Publication Data
US 2020/0327718 A1    Oct. 15, 2020

(51) Int. Cl.
| | |
|---|---|
| *G06T 15/08* | (2011.01) |
| *G06T 7/55* | (2017.01) |
| *G06T 9/00* | (2006.01) |
| *G09G 3/00* | (2006.01) |

(52) U.S. Cl.
CPC ............... *G06T 15/08* (2013.01); *G06T 7/55* (2017.01); *G06T 9/001* (2013.01); *G06T 9/002* (2013.01); *G09G 3/002* (2013.01); *G06T 2207/10024* (2013.01); *G06T 2207/20081* (2013.01); *G06T 2207/20084* (2013.01); *G06T 2207/30201* (2013.01)

(58) Field of Classification Search
CPC ..................................................... G06T 15/08
USPC ........................................................ 345/420
See application file for complete search history.

(56) References Cited

U.S. PATENT DOCUMENTS

| | | | |
|---|---|---|---|
| 2017/0337677 A1* | 11/2017 | Chen ....................... | G06T 15/08 |
| 2018/0025257 A1* | 1/2018 | van den Oord ...... | G06K 9/4652 |
| | | | 375/240.14 |

FOREIGN PATENT DOCUMENTS

WO    WO 2018089131 A1    5/2018

OTHER PUBLICATIONS

Tulsiani, Shubham, et al. "Multi-View Supervision for Single-View Reconstruction via Differentiable Ray Consistency." ArXiv: 1704.06254 [Cs], Apr. 2017 (Year: 2017).*

(Continued)

*Primary Examiner* — Shivang I Patel
(74) *Attorney, Agent, or Firm* — Baker Botts L.L.P.

(57) ABSTRACT

In one embodiment, a method includes accessing a number of pictures of an object, constructing a modeling volume for three-dimensional modeling of the object by processing the number of pictures using a machine-learning framework, where the modeling volume is associated with a number of color and opacity information that are associated with a number of regions in the modeling volume, and rendering an image of the object from a view-point using the modeling volume, where each pixel of the image is rendered by projecting a virtual ray from the view-point and through the modeling volume, determining one or more of the number of regions in the modeling volume intersected by the virtual ray, and determining a color and an opacity of the pixel based on an accumulation of the color and opacity information associated with the one or more of the number of regions intersected by the virtual ray.

17 Claims, 10 Drawing Sheets

(56) References Cited

OTHER PUBLICATIONS

International Search Report and Written Opinion for International Application No. PCT/US2020/025958, Jun. 25, 2020.
Tulsiani, et al., Multi-view Supervision for Single-view Reconstruction via Differentiable Ray Consistency, ARXIV.ORG, University of California, Berkeley, XP080764388, 14 pages, Apr. 20, 2017.
Garcia, et al., Downsampling and Storage of Pre-Computed Gradients for Volume Rendering, CEIG-Spanish Computer Graphics Conference, XP55705562, 10 pages, 2017.
Tulsiani, et al., Multi-view Consistency as Supervisory Signal for Learning Shape and Pose Prediction, 2018 IEEE/CVF Conference on Computer Vision and Pattern Recognition, IEEE, XP033476257, pp. 2897-2905, 2018.
Lombardi, et al., Neural Volumes: Learning Dynamic Renderable Volumes From Images, ARXIV.ORG, ACM Trans. Graph., vol. 38, No. 4, Article 65, XP081383263, 14 pages, Jun. 18, 2019.
Aanæs, et al., Large-Scale Data for Multiple-View Stereopsis, 16 pages.
Agisoft, Metashape, 19 pages, available via https://www.agisoft.com/.
Atcheson, et al., Time-resolved 3D Capture of Non-stationary Gas Flows, 9 pages.
Beeler, et al., High-quality Passive Facial Performance Capture Using Anchor Frames. ACM Trans. Graph. 30, 4, article 75, 10 pages, 2011.
De Bonet, et al., Poxels: Probabilistic Voxelized Volume Reconstruction, 8 pages.
Broadhurst, et al., A Probabilistic Framework for Space Carving, 6 pages.
Buehler, et al., Unstructured Lumigraph Rendering, In Conference on Computer Graphics and Interactive Techniques (SIGGRAPH), 9 pages, 2001.
Collet, et al., High-quality Streamable Free-viewpoint Video, 13 pages.
Dai, et al., Deformable Convolutional Networks, available on IFEE Xplore, 10 pages.
Davis, et al., Unstructured Light Fields. Computer Graphics Forum 31, 2, 10 pages, 2012.
Fitzgibbon, et al., Image-based Rendering Using Image-based Priors, the University of Oxford, 8 pages.
Furukawa, et al., Multi-View Stereo: A Tutorial. Foundations and Trends in Computer Graphics and Vision 9, 1-2, pp. 1-148, 2013.
Furukawa, et al., Accurate, Dense, and Robust Multiview Stereopsis, vol. 1, No. 1, 14 pages, 2008.
Fyffe, et al., Multi-View Stereo on Consistent Face Topology. Computer Graphics Forum 36, 2, 15 pages, 2017.
Goesele, et al., Multi-View Stereo for Community Photo Collections, 8 pages.
Ha, et al., Deltille Grids for Geometric Camera Calibration, available on IFEE Xplore, 9 pages.
Hawkins, et al., Acquisition of Time-varying Participating Media, USC Institute for Creative Technologies, 5 pages.
Hedman, et al., Deep Blending for Free-Viewpoint Image-Based Rendering. ACM Trans. Graph. 37, 6, Article 257, 15 pages, 2018.
Higgins, et al., β-VAE: Learning Basic Visual Concepts with a Constrained Variational Framework. In International Conference on Learning Representations (ICLR), 22 pages, 2017.
Ikits, et al., Volume Rendering Techniques, in GPU Gems, edited by Randima Fernando, Chapter 39, 12 pages.
Innmann, et al., VolumeDeform: Real-Time Volumetric Non-Rigid Reconstruction, arXiv:1603.08161v2, 17 pages, Jul. 30, 2016.
Isola, et al., Image-to-Image Translation with Conditional Adversarial Networks, available on IFEE Xplore, 10 pages.
Jaderberg, et al., Spatial Transformer Networks, arXix7:1506.02025v3, 15 pages, Feb. 4, 2016.
Kalantari, et al., Learning-based View Synthesis for Light Field Cameras, ACM Trans. Graph. 35, 6, Article 193, 10 pages, Nov. 2016.
Karras, et al., Progressive Growing of GANs for Improved Quality, Stability, and Variation, arXiv:1710.10196v3, 26 pages, Feb. 26, 2018.
Kim, et al., Deep Video Portraits. ACM Trans. Graph. 37, 4, Article 163, 14 pages, Aug. 2018.
Kingma, et al., Adam: A Method for Stochastic Optimization, arXiv:1412.6980v8, 15 pages, Jul. 23, 2015.
Kingma, et al., Auto-Encoding Variational Bayes, arXiv:1112.6114v10, 14 pages, May 1, 2014.
Kutulakos, et al., A Theory of Shape by Space Carving, University of Rochester, 34 pages, 2000.
Levoy, Display of Surfaces from Volume Data, University of North Carolina, 10 pages, 1987.
Lewis, et al., Pose Space Deformation: A Unified Approach to Shape Interpolation and Skeleton-driven Deformation, 8 Pages.
Lombardi, et al., Deep Appearance Models for Face Rendering. ACM Trans. Graph. 37, 4, Article 68, 13 pages, Aug. 2018.
Martin-Brualla, et al., LookinGood: Enhancing Performance Capture with Real-time Neural Re-rendering, ACM Trans. Graph. 37, 6, Article 225, 14 pages, Nov. 12, 2018.
Merrell, et al., Real-Time Visibility-Based Fusion of Depth Maps, 8 pages.
Newcombe, et al., DynamicFusion: Reconstruction and Tracking of Non-Rigid Scenes in Real-Time, available on IFEE Xplore, 10 pages, 2015.
Nguyen-Phuoc, et al., Render-Net: A Deep Convolutional Network for Differentiable Rendering from 3D Shapes, In Advances in Neural Information Processing Systems (NeurIPS), 11 pages, 2018.
Nießner, et al., Real-time 3D Reconstruction at Scale Using Voxel Hashing, University of Erlangen-Nuremberg, 11 pages.
Overbeck, et al., A System for Acquiring, Processing, and Rendering Panoramic Light Field Stills for Virtual Reality, ACM Trans. Graph. 37, 6, Article 197, 15 pages, Nov. 2018
Paschalidou, et al., RayNet: Learning Volumetric 3D Reconstruction with Ray Potentials, available on IFEE Xplore, 10 pages.
Penner, et al., Soft 3D Reconstruction for View Synthesis. ACM Trans. Graph. 36, 6, Article, 235, 11 pages, Nov. 2017.
Prada, et al., Motion Graphs for Unstructured Textured Meshes, SIGGRAPH'16 Technical Paper, Jul. 24-28, 2016, Anaheim, CA, 14 pages, 2016.
Riegler, et al., OctNet: Learning Deep 3D Representations at High Resolutions, available on IFEE Xplore, 10 pages.
Roth, et al., Specular Flow and the Recovery of Surface Structure, Brown University, 8 pages.
Savinov, et al., Semantic 3D Reconstruction with Continuous Regularization and Ray Potentials Using a Visibility Consistency Constraint, available on IFEE Xplore, 10 pages.
Scharstein, et al., A Taxonomy and Evaluation of Dense Two-Frame Stereo Correspondence Algorithms, 61 pages, Nov. 2001.
Schönberger, et al., Structure-from-Motion Revisited, available on IFEE Xplore, 10 pages.
Schönberger, et al., Pixelwise View Selection for Unstructured Multi-View Stereo, 18 pages, 2016.
Seitz, et al., Photorealistic Scene Reconstruction by Voxel Coloring. International Journal of Computer Vision 35, 2, 32 pages, 1999.
Seitz, et al., Photorealistic Scene Reconstruction by Voxel Coloring, In Proc. Computer Vision and Pattern Recognition Conf., 7 pages, 1997.
Shu, et al., Deforming Autoencoders: Unsupervised Disentangling of Shape and Appearance. In European Conference on Computer Vision (ECCV), 16 pages, 2018.
Sitzmann, et al., DeepVoxels: Learning Persistent 3D Feature Embeddings. arXiv:1812.01024 [cs.CV], 10 pages, Apr. 11, 2019.
Szeliski, et al., Stereo Matching with Transparency and Matting. International Journal of Computer Vision (IJCV) 17 pages, 1998.
Tulsiani, et al., Multi-view Consistency as Supervisory Signal for Learning Shape and Pose Prediction. In Computer Vision and Pattern Recognition (CVPR), 9 pages.
Tulsiani, et al., Multi-view Supervision for Single-view Reconstruction via Differentiable Ray Consistency. In Computer Vision and Pattern Recognition (CVPR), 9 pages.
Ulusoy, et al., Towards Probabilistic Volumetric Reconstruction Using Ray Potentials, 9 pages.

(56) References Cited

OTHER PUBLICATIONS

Ulyanov, et al., Deep Image Prior. In Conference on Computer Vision and Pattern Recognition (CVPR), 9 pages.
Wang, et al., Video-to-Video Synthesis, arXiv:1808.06601v2, 14 pages, Dec. 3, 2018.
Xu, et al., Dynamic Hair Capture Using Spacetime Optimization. ACM Trans. Graph. 33, 6, 11 pages.
Zach, et al., A Globally Optimal Algorithm for Robust TV-L1 Range Image Integration, VRVis Research Center 8 pages.
Zhou, et al., Stereo Magnification: Learning View Synthesis using Multiplane Images. ACM Trans. Graph. 37, 4, Article 65, 12 pages, Aug. 2018.
Zollhöfer, et al., Real-time Non-rigid Reconstruction Using an RGB-D Camera, 12 pages.

\* cited by examiner

THREE-DIMENSIONAL MODELING VOLUME FOR RENDERING IMAGES

TECHNICAL FIELD

This disclosure generally relates to artificial reality systems, and in particular, related to constructing a three-dimensional modeling volume of an object.

BACKGROUND

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

SUMMARY OF PARTICULAR EMBODIMENTS

In particular embodiments, a computing device may construct a three-dimensional (3D) modeling volume for 3D modeling of a target object by processing a plurality of pictures of the target object in a state with a machine-learning framework. Traditionally, reconstructing unstructured objects, including hair, smoke, fire, cloud, etc., has been considered difficult because they are difficult to parameterize, have complex volumetric structures, and have variable deformability. Moreover, 3D modeling typically represents objects as a collection of small planar objects along its surface, but this representation performs poorly for highly curved surfaces and with intricate shapes. The computing device may reconstruct an image of the object based on a 3D modeling volume to overcome such limitations. A first computing device may access a first plurality of pictures of an object in a first state. The first plurality of pictures may be taken from a first plurality of view-points, respectively. In particular embodiments, the first computing device may construct a modeling volume for 3D modeling of the object by processing the first plurality of pictures using a machine-learning framework. The modeling volume may be associated with a plurality of color and opacity information that may be associated with a plurality of regions in the modeling volume. In particular embodiments, the machine-learning framework comprises an encoder and a decoder. The encoder may construct an encoding vector based on information of input pictures. The decoder may produce a modeling volume by decoding the encoding vector. In particular embodiments, the encoder may be a convolutional neural network. In particular embodiments, the decoder may be a convolutional decoder. In particular embodiments, the decoder may be a linear basis decoder. In particular embodiments, a computing device may modify the encoding vector for the object in a state to generate a modeling volume for modeling the object in another state. In particular embodiments, the computing device may linearly interpolate a first encoding vector for the object in a first state and a second encoding vector for the object in a second state to generate a modeling volume for modeling the object in a third state. The third state may be in between the first state and the second state. In particular embodiments, the second computing device may render a two-dimensional (2D) image of the object from a virtual view-point using the modeling volume. The second computing device may be different from the first computing device. The second computing device may render each pixel of the image based on the plurality of color and opacity information associated with the modeling volume. The second computing device may project a virtual ray through the modeling volume from the virtual view-point. The virtual ray may intersect the pixel in the image. The second computing device may determine one or more of the plurality of regions in the modeling volume intersected by the virtual ray. The second computing device may determine a color and an opacity of the pixel based on an accumulation of the color and opacity information associated with the one or more of the plurality of regions intersected by the virtual ray. In particular embodiments, the second computing device may accumulate opacity-weighted color associated with the one or more regions until an accumulated opacity associated with the one or more regions reaches a threshold when the second computing device accumulate the color and opacity information associated with the one or more regions intersected by the virtual ray. A third computing device may train the machine-learning framework. The third computing device may be different from the first computing device. The third computing device may be different from the second computing device. The third computing device may train the machine-learning framework by repeating iterations until a pre-determined condition is met. The third computing device may access a second plurality of pictures of the object. The second plurality of pictures may be taken from a second plurality of view-points, respectively. The third computing device may construct a second modeling volume for three-dimensional modeling of the object by processing a subset of the second plurality of pictures using the machine-learning framework. The first plurality of view-points may be a subset of the second plurality of view-points. The subset of the second plurality of pictures may be taken from a first plurality of view-points. The third computing device may render a plurality of two-dimensional images of the object from a plurality of virtual view-points corresponding to the second plurality of view-points. The third computing device may update the machine-learning framework based on comparisons between the plurality of two-dimensional images and the second plurality of pictures. In order to update the machine-learning framework based on comparisons between the plurality of two-dimensional images and the second plurality of pictures, the third computing device may calculate a pre-determined loss function based on comparisons between each of the rendered plurality of two-dimensional images from a virtual view-point and a picture taken from a corresponding view-point among the second plurality of pictures. The third computing device may adjust parameters of the machine-learning framework by performing backpropagation based on the calculated loss functions. One or more sets of pictures of the object taken from the second plurality of view-points may be used for training. Each of the one or more sets of pictures may be used as input for each iteration. Each of the one or more sets may correspond to a time instance. A background per each of the second plurality of view-points may be static across the time instances. In particular embodiments, a region in the modeling volume may be represented by a voxel comprising information for color and opacity of the region. A color of a region may be represented by RGB color codes. An opacity of a region may be represented by a scalar value between 0 and 1. In particular embodiments, the modeling volume may be represented by a three-dimensional warp volume and a three-dimensional information volume. Each region in the warp volume may point to a region in the information volume. Each region in the information volume is associated with information for color and opacity. Information for color and opacity of a first region in the modeling volume may be accessed from a second region in the information volume that is pointed by a third region in the warp volume. The third region in the warp volume may correspond to the first region in the modeling volume.

In particular embodiments, a computing device may access a first plurality of pictures of an object. The first plurality of pictures may be taken from a first plurality of view-points, respectively. The computing device may construct a modeling volume for three-dimensional modeling of the object by processing the first plurality of pictures using a machine-learning framework. The modeling volume may be associated with a plurality of color and opacity information that are associated with a plurality of regions in the modeling volume. The computing device may render a two-dimensional image of the object from a virtual view-point using the modeling volume. The computing device may render each pixel of the image by determining a color and opacity of the pixel based the constructed modeling volume. The computing device may first project a virtual ray from the virtual view-point and through the modeling volume. The computing device may determine one or more of the plurality of regions in the modeling volume intersected by the virtual ray. The computing device may determine a color and an opacity of the pixel based on an accumulation of the color and opacity information associated with the one or more of the plurality of regions intersected by the virtual ray.

In particular embodiments, one or more computer-readable non-transitory storage media may embody software that is operable when executed to perform a method according to or within any of the above mentioned embodiments. In particular embodiments, a system may comprise: one or more processors; and at least one memory coupled to the processors and comprising instructions executable by the processors, the processors operable when executing the instructions to perform a method according to or within any of the above mentioned embodiments. In particular embodiments, a computer program product, preferably comprising a computer-readable non-transitory storage media, may be operable when executed on a data processing system to perform a method according to or within any of the above mentioned embodiments.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, and a system, wherein any feature mentioned in one claim category, e.g. method, can be claimed in another claim category, e.g. storage medium, system, and computer program product as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1:
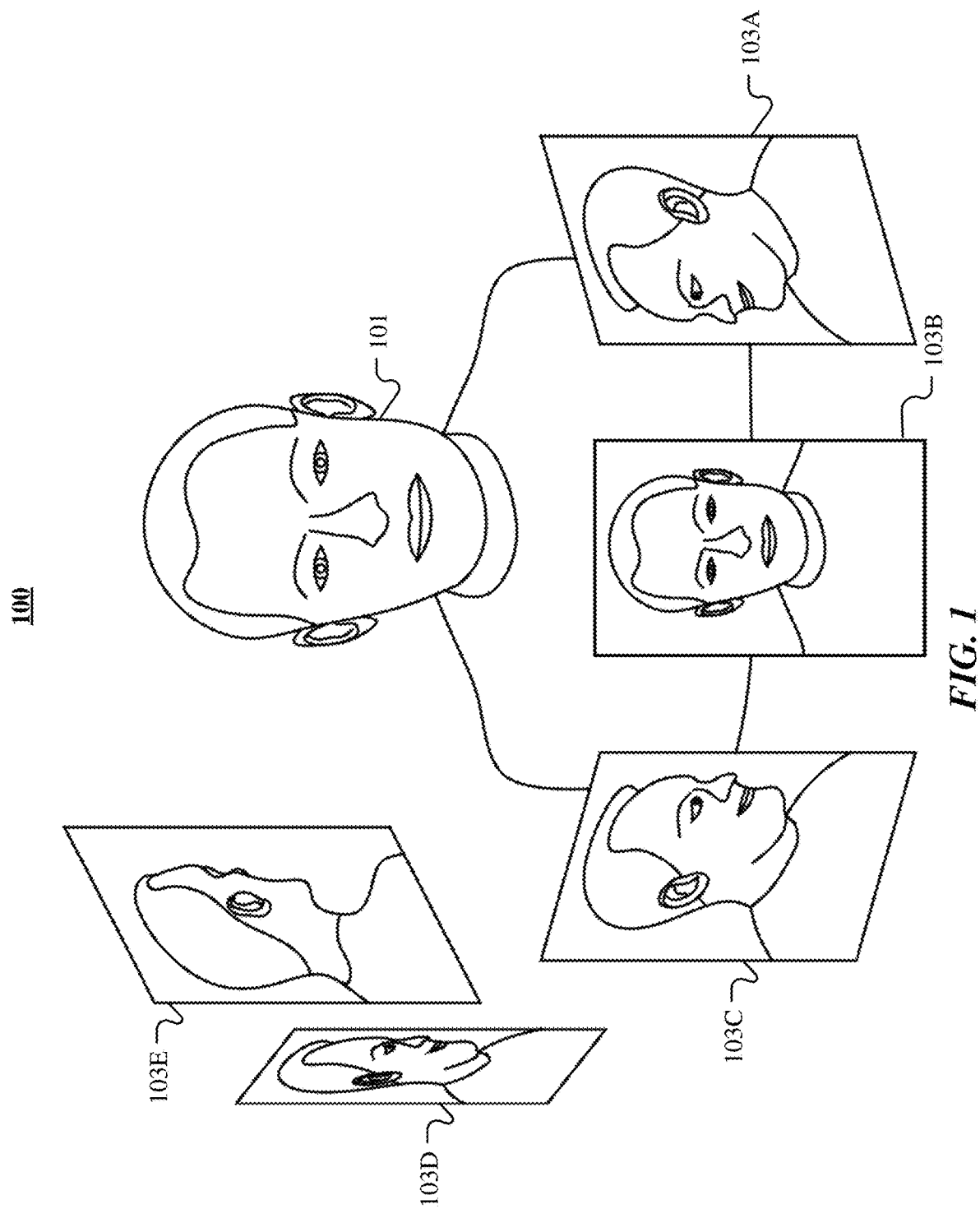
FIG. 1 illustrates an example multi-view capture system.

In particular embodiments, a computing device may construct a three-dimensional (3D) modeling volume for 3D modeling of a target object by processing a plurality of pictures of the target object in a state with a machine-learning framework. Traditionally, reconstructing unstructured objects, including hair, smoke, fire, cloud, etc., has been considered difficult because they are difficult to parameterize, have complex volumetric structures, and have variable deformability. Moreover, 3D modeling typically represents objects as a collection of small planar objects along its surface, but this representation performs poorly for highly curved surfaces and with intricate shapes. The computing device may reconstruct an image of the object based on a 3D modeling volume to overcome such limitations. A first computing device may access a first plurality of pictures of an object in a first state. The first plurality of pictures may be taken from a first plurality of view-points, respectively. In particular embodiments, the first computing device may construct a modeling volume for 3D modeling of the object by processing the first plurality of pictures using a machine-learning framework. The modeling volume may be associated with a plurality of color and opacity information that may be associated with a plurality of regions in the modeling volume. In particular embodiments, the machine-learning framework comprises an encoder and a decoder. The encoder may construct an encoding vector based on information of input pictures. The decoder may produce a modeling volume by decoding the encoding vector. In particular embodiments, the encoder may be a convolutional neural network. In particular embodiments, the decoder may be a convolutional decoder. In particular embodiments, the decoder may be a linear basis decoder. In particular embodiments, a computing device may modify the encoding vector for the object in a state to generate a modeling volume for modeling the object in another state. In particular embodiments, the computing device may linearly interpolate a first encoding vector for the object in a first state and a second encoding vector for the object in a second state to generate a modeling volume for modeling the object in a third state. The third state may be in between the first state and the second state. In particular embodiments, the second computing device may render a two-dimensional (2D) image of the object from a virtual view-point using the modeling volume. The second computing device may be different from the first computing device. The second computing device may render each pixel of the image based on the plurality of color and opacity information associated with the modeling volume. The second computing device may project a virtual ray through the modeling volume from the virtual view-point. The virtual ray may intersect the pixel in the image. The second computing device may determine one or more of the plurality of regions in the modeling volume intersected by the virtual ray. The second computing device may determine a color and an opacity of the pixel based on an accumulation of the color and opacity information associated with the one or more of the plurality of regions intersected by the virtual ray. In particular embodiments, the second computing device may accumulate opacity-weighted color associated with the one or more regions until an accumulated opacity associated with the one or more regions reaches a threshold when the second computing device accumulate the color and opacity information associated with the one or more regions intersected by the virtual ray. A third computing device may train the machine-learning framework. The third computing device may be different from the first computing device. The third computing device may be different from the second computing device. The third computing device may train the machine-learning framework by repeating iterations until a pre-determined condition is met. The third computing device may access a second plurality of pictures of the object. The second plurality of pictures may be taken from a second plurality of view-points, respectively. The third computing device may construct a second modeling volume for three-dimensional modeling of the object by processing a subset of the second plurality of pictures using the machine-learning framework. The first plurality of view-points may be a subset of the second plurality of view-points. The subset of the second plurality of pictures may be taken from a first plurality of view-points. The third computing device may render a plurality of two-dimensional images of the object from a plurality of virtual view-points corresponding to the second plurality of view-points. The third computing device may update the machine-learning framework based on comparisons between the plurality of two-dimensional images and the second plurality of pictures. In order to update the machine-learning framework based on comparisons between the plurality of two-dimensional images and the second plurality of pictures, the third computing device may calculate a pre-determined loss function based on comparisons between each of the rendered plurality of two-dimensional images from a virtual view-point and a picture taken from a corresponding view-point among the second plurality of pictures. The third computing device may adjust parameters of the machine-learning framework by performing backpropagation based on the calculated loss functions. One or more sets of pictures of the object taken from the second plurality of view-points may be used for training. Each of the one or more sets of pictures may be used as input for each iteration. Each of the one or more sets may correspond to a time instance. A background per each of the second plurality of view-points may be static across the time instances. In particular embodiments, a region in the modeling volume may be represented by a voxel comprising information for color and opacity of the region. A color of a region may be represented by RGB color codes. An opacity of a region may be represented by a scalar value between 0 and 1. In particular embodiments, the modeling volume may be represented by a three-dimensional warp volume and a three-dimensional information volume. Each region in the warp volume may point to a region in the information volume. Each region in the information volume is associated with information for color and opacity. Information for color and opacity of a first region in the modeling volume may be accessed from a second region in the information volume that is pointed by a third region in the warp volume. The third region in the warp volume may correspond to the first region in the modeling volume. Although this disclosure describes constructing a 3D modeling volume based on a plurality of pictures of an object in a particular manner, this disclosure contemplates constructing a 3D modeling volume based on a plurality of pictures of an object in any suitable manner.

In particular embodiments, a first computing device may access a first plurality of pictures of an object in a first state. The first plurality of pictures may be taken from a first plurality of view-points, respectively. FIG. 1 illustrates an example multi-view capture system. As an example and not by way of limitation, illustrated in FIG. 1, the multi-view capture system 100 may comprise a plurality of cameras around an object spot, each of the plurality of cameras may be placed at a pre-determined view-point. When a target object 101 is located at the object spot, the plurality of cameras may take pictures simultaneously. Each of the pictures 103A-103E may capture the target object 101 in a state from a corresponding view-point. As the pictures 103A, 103B, 103C, 103D, and 103E are taken at a same time, the target object 101 captured in those pictures may have consistent pose. Also, the environment surrounding the target object 101 including light may stay consistent throughout the pictures 103A-103E. In particular embodiments, a plurality of pictures from a plurality of view-points may be taken at different time if the target object 101 is not moving and the environment stays consistently. Although this disclosure describes accessing a plurality of pictures of an object in a state in a particular manner, this disclosure contemplates accessing a plurality of pictures of an object in a state in any suitable manner.

In particular embodiments, the first computing device may construct a modeling volume for three-dimensional (3D) modeling of the object by processing the first plurality of pictures using a machine-learning framework. The modeling volume may be associated with a plurality of color and opacity information that may be associated with a plurality of regions in the modeling volume. As an example and not by way of limitation, continuing with a prior example, a computing device may access a plurality of pictures 103A-103E of the target object 101 from the multi-view capture system 100. The computing device may select a subset of the plurality of pictures. The selected subset of the plurality of pictures may be taken from a pre-determined view-points. Though providing all of the plurality of pictures 103A-103E as input to the machine-learning framework may result in producing a modeling volume modeling of the target object in higher accuracy, higher number of pictures may require more computing resources. Thus, the machine-learning framework may be configured to take a particular number of pictures taken from pre-determined view-points. The computing device may construct a modeling volume of the target object 101 by processing the selected subset of the plurality of pictures 103A-103E using the machine-learning framework. Although this disclosure describes constructing a modeling volume of an object in a particular manner, this disclosure contemplates constructing a modeling volume of an object in any suitable manner.

Figure 2:
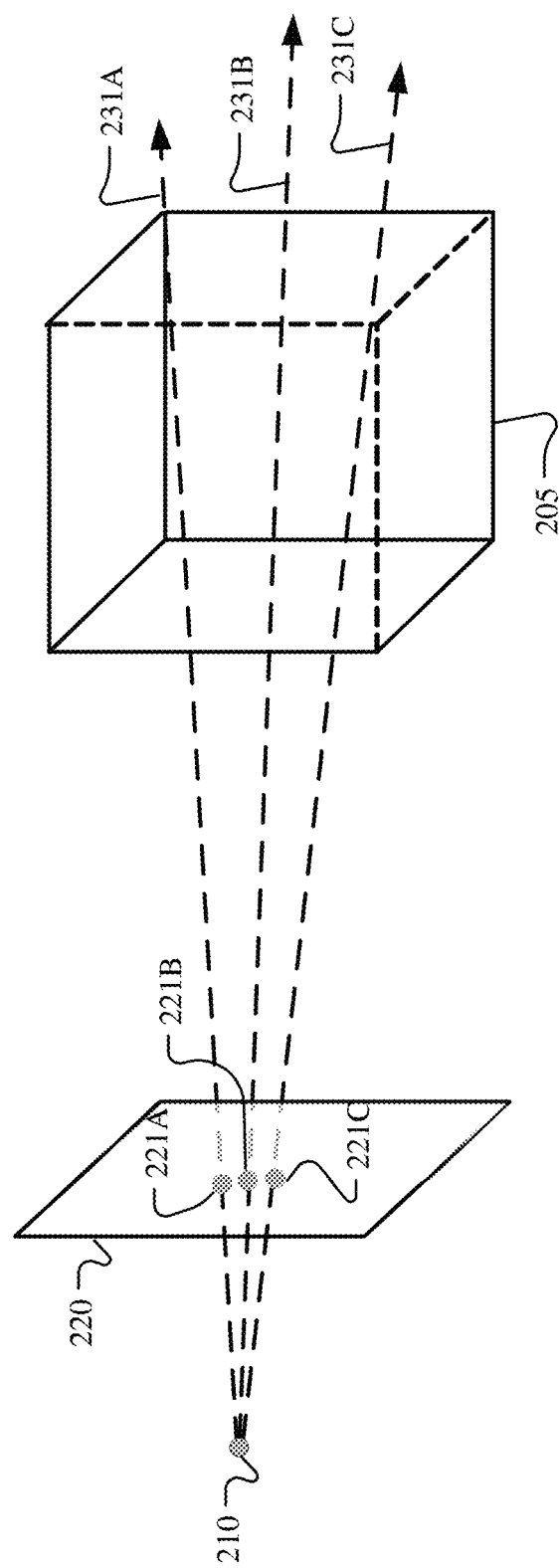
FIG. 2 illustrates an example rendering of an object based on 3D modeling volume.

In particular embodiments, a second computing device may render a two-dimensional (2D) image of the object from a virtual view-point using the modeling volume. The second computing device may be different from the first computing device. The second computing device may render each pixel of the image based on the plurality of color and opacity information associated with the modeling volume. The second computing device may project a virtual ray through the modeling volume from the virtual view-point. The virtual ray may intersect the pixel in the image. The second computing device may determine one or more of the plurality of regions in the modeling volume intersected by the virtual ray. The second computing device may determine a color and an opacity of the pixel based on an accumulation of the color and opacity information associated with the one or more of the plurality of regions intersected by the virtual ray. In particular embodiments, the second computing device may accumulate opacity-weighted color associated with the one or more regions until an accumulated opacity associated with the one or more regions reaches a threshold when the second computing device accumulate the color and opacity information associated with the one or more regions intersected by the virtual ray. FIG. 2 illustrates an example rendering of an object based on 3D modeling volume. As an example and not by way of limitation, illustrated in FIG. 2, a computing device may determine a virtual view-point 210 from which a 3D image of the target object will be rendered. The computing device may determine a plane where the rendered image 220 locates between the virtual view-point 210 and the modeling volume 205 of the target object. For each of the pixels 221A, 221B, 221C in the rendered image 220, the computing device project a virtual ray that intersects the pixel and goes through the modeling volume 205. Though FIG. 2 illustrates only three pixels 221A, 221B, and 221C and three virtual rays 231A, 231B, and 231C for brevity purpose, the computing device may project a virtual ray for each pixel in the rendered image 220. For a pixel 221A and its corresponding virtual ray 231A, the computing device may determine one or more regions in the modeling volume 205 intersected by the virtual ray 231A. Each of the determined one or more regions may be associated with a color and opacity information. The computing device may determine a color and an opacity of the pixel 221A by accumulating the one or more opacity-weighted colors corresponding to the determined one or more regions until an accumulated opacity associated with the determined one or more regions reaches a threshold. Although this disclosure describes rendering a 2D image of an object from a virtual view-point using a modeling volume of the object in a particular manner, this disclosure contemplates rendering a 2D image of an object from a virtual view-point using a modeling volume of the object in any suitable manner.

Figure 3:
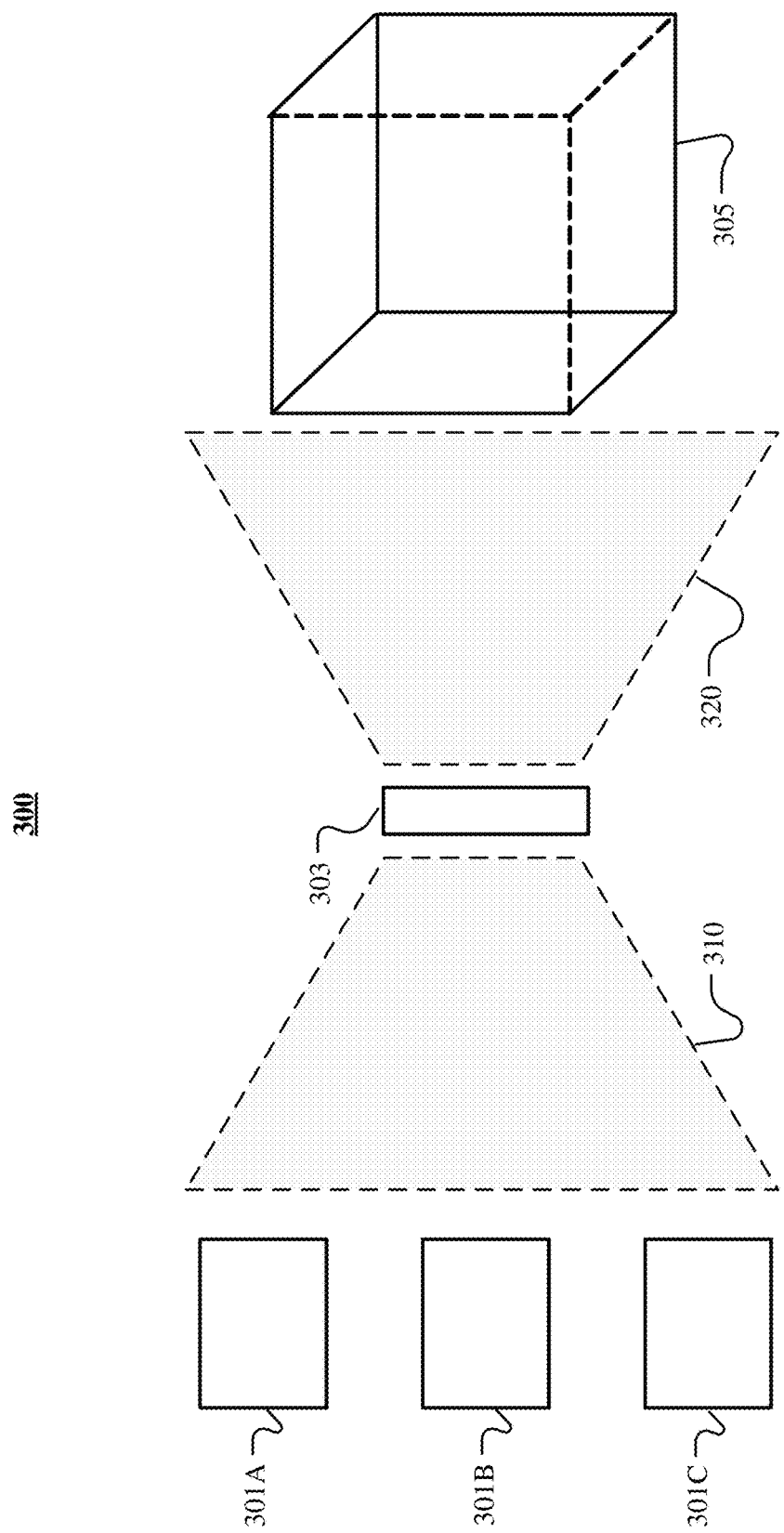
FIG. 3 illustrates an example machine-learning framework with an encoder and a decoder.

In particular embodiments, the machine-learning framework comprises an encoder and a decoder. The encoder may construct an encoding vector based on information of input pictures. The decoder may produce a modeling volume by decoding the encoding vector. The encoder-decoder architecture may allow for conditional decoding, where only part of the target object's state may be modified (i.e., expression during speech, view-dependent appearance effects, etc.). The encoder-decoder architecture may support the conditional decoding without requiring specialized treatment on the decoder side so long as paired samples of the conditioning variable are available during training. FIG. 3 illustrates an example machine-learning framework with an encoder and a decoder. As an example and not by way of limitation, illustrated in FIG. 3, a machine-learning framework 300 to construct a modeling volume 305 based on images 301A, 301B, 301C of an object may comprise an encoder 310 and a decoder 320. The encoder 310 illustrated in FIG. 3 takes three images 301A, 301B and 301C of an object as input. The encoder 310 may process data of the input images 301A, 301B, and 301C to generate an encoding vector 303. The decoder 320 of the machine-learning framework 300 may take the encoding vector 303 as input and construct a modeling volume 305 by decoding the encoding vector 303. Although this disclosure describes a particular machine-learning framework for generating a modeling volume based on a plurality of images of an object, this disclosure contemplates any suitable machine-learning framework for generating a modeling volume based on a plurality of images of an object.

Figure 4:
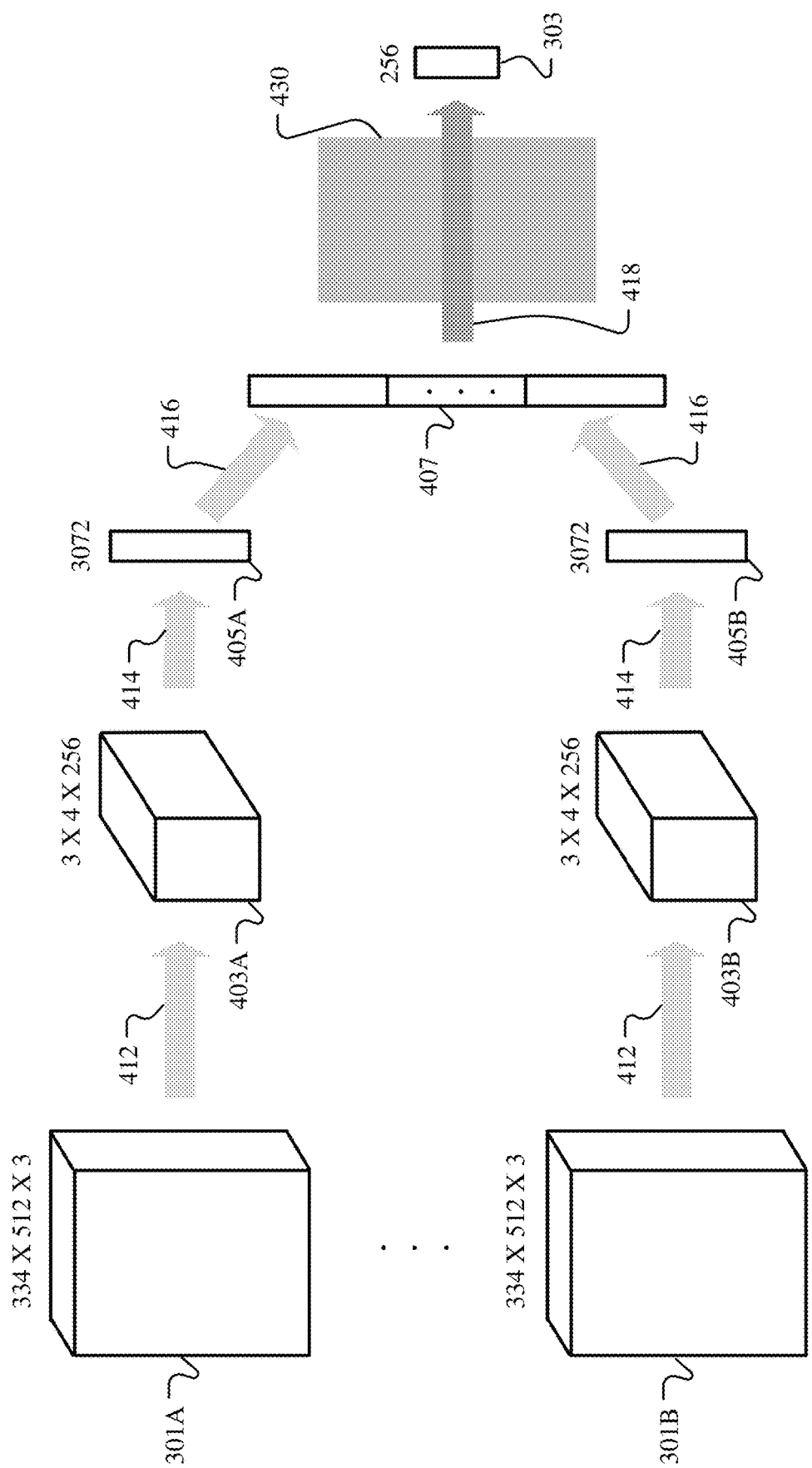
FIG. 4 illustrates an example convolutional encoder of the machine-learning framework to construct a modeling volume based on a plurality of images of an object.

In particular embodiments, the encoder may be a convolutional neural network. FIG. 4 illustrates an example convolutional encoder of the machine-learning framework. As an example and not by way of limitation, illustrated in FIG. 4, the encoder 310 may take k images, as input. FIG. 4 illustrates only two input images 301A and 301B for brevity purpose. The input images in the example illustrated in FIG. 4 are of resolution 334×512. As each pixel in the image is represented by RGB codes, the pixel is represented by three channels. At step 412, the encoder 310 may produce a 3×4×256 matrix 403A, 403B by processing each of the input images 301A, 301B through a convolutions neural network. At step 414, the encoder 310 may reshape each produced matrix 403A or 403B into a vector 405A, 405B of 3072 dimensions. At step 416, the encoder 310 may concatenate the vectors 405A, 405B into a single vector 407. The size of the concatenated vector 407 may depend on the number of input images. At step 418, the encoder 310 may generate an encoding vector 303 of 256 dimensions by processing the concatenated vector 407 through a fully-connected layer 430. Although this disclosure describes generating an encoding vector by encoding a plurality of images of an object in a particular manner, this disclosure contemplates generating an encoding vector by encoding a plurality of images of an object in any suitable manner.

In particular embodiments, a region in the modeling volume may be represented by a voxel comprising information for color and opacity of the region. A color of a region may be represented by RGB color codes. An opacity of a region may be represented by a scalar value between 0 and 1, where 0 may represent that the region is fully-transparent and 1 may represent that the region is completely non-transparent. Although this disclosure describes representing a region in the modeling volume in a particular manner, this disclosure contemplates representing a region in the modeling volume in any suitable manner.

Figure 5A:
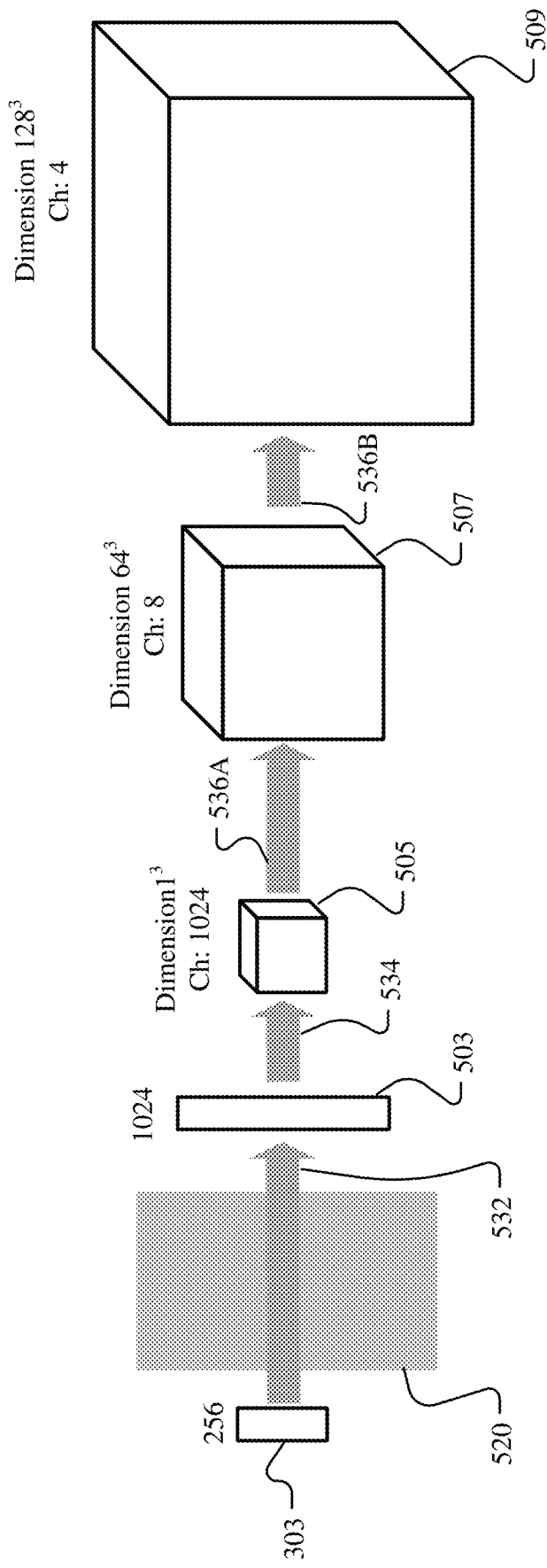
FIGS. 5A-5B illustrate example decoders of the machine-learning framework to construct a modeling volume based on a plurality of images of an object.
Figure 5B:
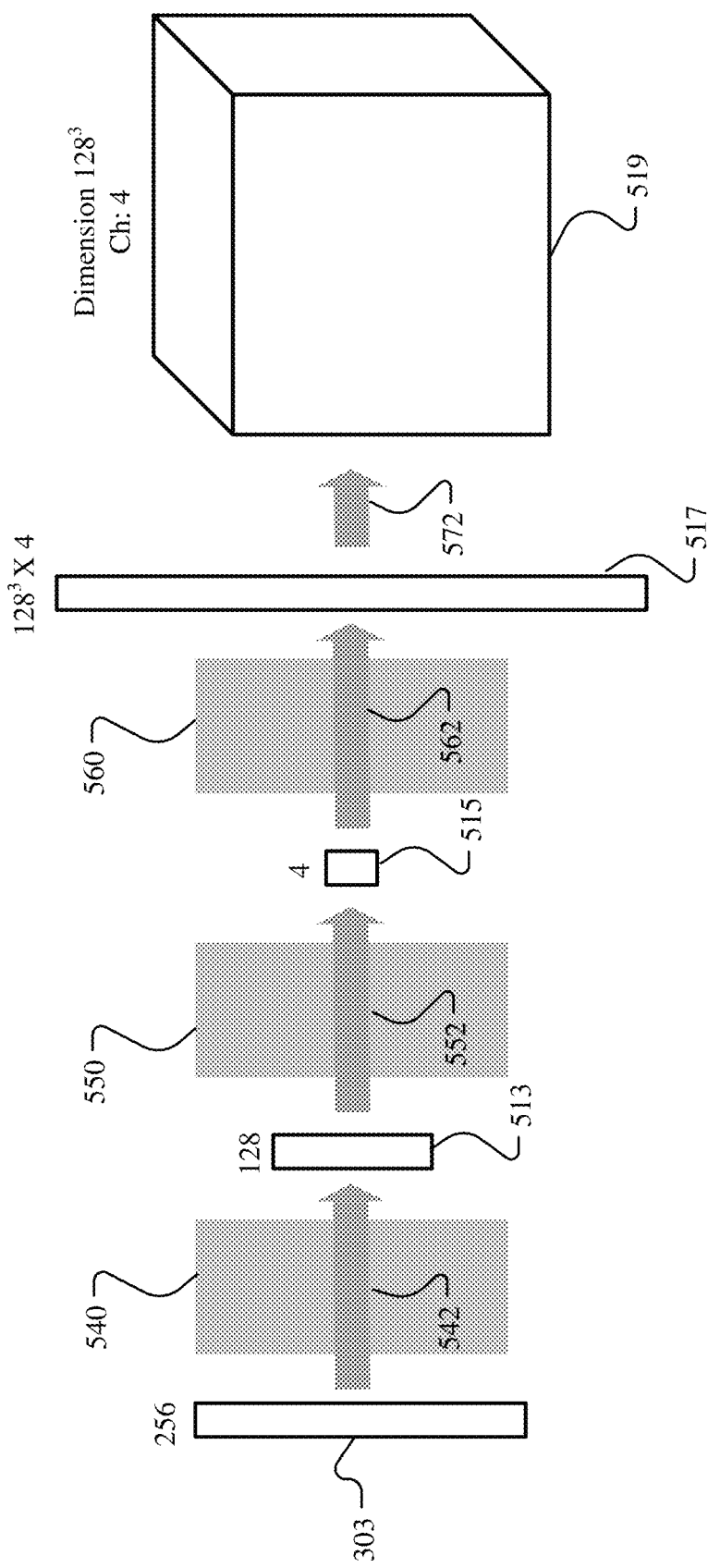

FIGS. 5A-5B illustrate example decoders of the machine-learning framework to construct a modeling volume based on a plurality of images of an object. The produced modeling volume may be voxel volume, where each voxel may represent a color and an opacity of a corresponding region of the modeling volume. In particular embodiments, the decoder may be a convolutional decoder. FIG. 5A illustrates an example convolutional decoder. As an example and not by way of limitation, continuing with a prior example, and illustrated in FIG. 5A, the decoder 320 of the machine-learning framework may take the 256-dimensional encoding vector 303 as input. At step 532, the decoder 320 may perform a non-linear projection of the encoding vector 303 into a 1024-dimensional vector 503 through a fully-connected layer 520. At step 534, the decoder 320 may reshape the vector 503 into a cube 505 with 1024 channels. A dimension of the cube may be 1×1×1. At step 536A, the decoder 320 may generate a 64×64×64 tensor 507 with 8 channels by processing the cube 505 through de-convolutional neural networks. At step 536B, the decoder 320 may generate a 128×128×128 volume 509 with 4 channels by processing 64×64×64 tensor 507 through de-convolutional neural networks. Each channel of the volume 509 may represent a color code or an opacity of the corresponding voxel. Though steps 536A and 536B are illustrated separately in FIG. 5A, the steps 536A and 536B may be combined into a single step. The dimensional sizes of data objects illustrated in FIG. 5A are examples. The dimensional sizes may be configurable. Although this disclosure describes a particular convolutional decoder, this disclosure contemplates any suitable convolutional decoder.

In particular embodiments, the decoder may be a linear basis decoder. FIG. 5B illustrates an example linear basis decoder. As an example and not by way of limitation, continuing with a prior example and illustrated in FIG. 5B, the decoder 320 may take the encoding vector 303 as input. The encoding vector 303 may be of 256 dimensions. At step 542, the decoder 320 may generate a 128-dimensional vector 513 by processing the encoding vector 303 through a first fully-connected layer 540. At step 552, the decoder 320 may generate a 4-dimensional vector 515 by processing the 128-dimensional vector 513 through a second fully-connected layer 550. At step 562, the decoder 320 may generate an 8388608-dimensional vector 517 by processing the 4-dimensional vector 515 through a third fully-connected layer 560. At step 572, the decoder 320 may generate a 128×128×128 volume with 4 channels by reshaping the 8388608-dimensional vector 517. Each channel of the volume 519 may represent a color code or an opacity of the corresponding voxel. The dimensional sizes of data objects illustrated in FIG. 5B are examples. The dimensional sizes may be configurable. Although this disclosure describes a particular linear basis decoder, this disclosure contemplates any suitable linear basis decoder.

In particular embodiments, a third computing device may train the machine-learning framework by a supervised regression algorithm. The third computing device may be different from the first computing device. The third computing device may be different from the second computing device. The third computing device may train the machine-learning framework by repeating iterations until a pre-determined condition is met. A training input to the machine-learning framework for an iteration may be a second plurality of pictures of the target object in a state. The third computing device may access the second plurality of pictures of the object. The second plurality of pictures may be taken from a second plurality of view-points, respectively. The third computing device may construct a second modeling volume for three-dimensional modeling of the object by processing a subset of the second plurality of pictures using the machine-learning framework. The first plurality of view-points may be a subset of the second plurality of view-points. The subset of the second plurality of pictures may be taken from a first plurality of view-points. The third computing device may, for each of the second plurality of pictures, render an image from a corresponding virtual view-point. The third computing device may update the machine-learning framework based on comparisons between the second plurality of pictures and their corresponding rendered images. In order to update the machine-learning framework based on comparisons, the third computing device may calculate a pre-determined loss function based on comparisons between each of the rendered images from a virtual view-point and a picture taken from a corresponding view-point among the second plurality of pictures. The third computing device may adjust parameters of the machine-learning framework by performing backpropagation based on the calculated loss functions. Although this disclosure describes training the machine-learning framework in a particular manner, this disclosure contemplates training the machine-learning framework in any suitable manner.

One or more sets of pictures of the object taken from the second plurality of view-points may be used for training. Each of the one or more sets of pictures may be used as input for each iteration. Each of the one or more sets may correspond to a time instance. A background per each of the second plurality of view-points may be static across the time instances. As an example and not by way of limitation, a multi-view capture system 100 may take a video stream at each deployed camera. A plurality of pictures for a time instance may be provided as input for an iteration of the training of the machine-learning framework. Before taking the video streams, each camera takes a reference picture of background without the target object in position. The machine-learning framework may ignore information for color and opacity of the background from each input picture based on the reference picture. Although this disclosure describes providing video streams as training input to the machine-learning framework in a particular manner, this disclosure contemplates providing video streams as training input to the machine-learning framework in any suitable manner.

Figure 6:
FIG. 6 illustrates an example animation of the target object by interpolating encoding vectors.
Figure 6:
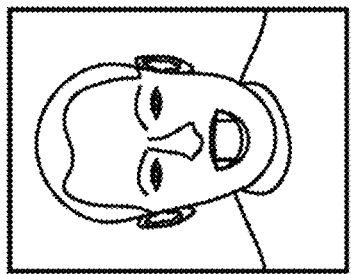
Figure 6:
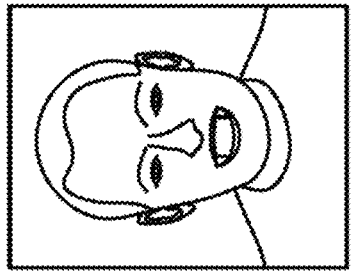
Figure 6:
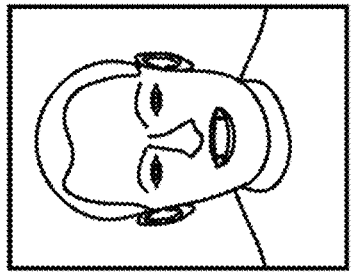
Figure 6:
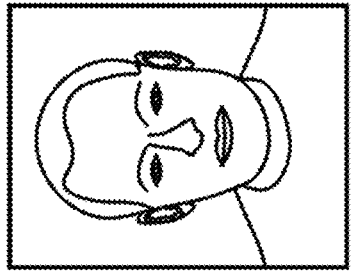

In particular embodiments, a computing device may modify the encoding vector for the object in a state to generate a modeling volume for modeling the object in another state. In particular embodiments, the computing device may linearly interpolate a first encoding vector for the object in a first state and a second encoding vector for the object in a second state to generate a modeling volume for modeling the object in a third state. The third state may be in between the first state and the second state. FIG. 6 illustrates an example animation of the target object by interpolating encoding vectors. As an example and not by way of limitation, illustrated in FIG. 6, a computing device may generate a first encoding vector and a first modeling volume of a person in a first state. In the first state, the person closes his mouth. A rendered image of the person in the first state is shown at (a). The computing device may generate a second encoding vector and a second modeling volume of the person in a second state. In the second state, the person fully opens his mouth. A rendered image of the person in the second state is shown at (e). The computing device may generate a third, fourth and fifth encoding vectors by linearly interpolating the first encoding vector and the second encoding vector. The third, fourth, and fifth encoding vectors may be generated using different coefficients to the first encoding vector and the second encoding vector. The computing device may generate a third, fourth and fifth modeling volumes by providing the third, fourth, and fifth encoding vectors to the decoder, respectively. Rendered image from the third modeling volume is shown at (b), where the person opens his mouth for about a quarter. Rendered image from the fourth modeling volume is shown at (c), where the person opens his mouth for about a half. Rendered image from the fifth modeling volume is shown at (d), where the person opens his mouth for about three quarters. Although this disclosure describes animating an object by linearly interpolating encoding vectors in a particular manner, this disclosure contemplates animating an object by linearly interpolating encoding vectors in any suitable manner.

In particular embodiments, the modeling volume may be represented by a three-dimensional warp volume and a three-dimensional information volume. Voxel representations of the modeling volume may be expensive in terms of memory space especially when representing a scene comprising significant amount of empty space. Utilizing the warp volume and the information volume may allow us to utilize the memory resource in an efficient way as well as to model movements of the object more naturally. Each region in the warp volume may point to a region in the information volume. Each region in the information volume is associated with information for color and opacity. Information for color and opacity of a first region in the modeling volume may be accessed from a second region in the information volume that is pointed by a third region in the warp volume. The third region in the warp volume may correspond to the first region in the modeling volume. Although this disclosure describes representing a model volume with a warp volume and an information volume in a particular manner, this disclosure contemplates representing a model volume with a warp volume and an information volume in any suitable manner.

Figure 7:
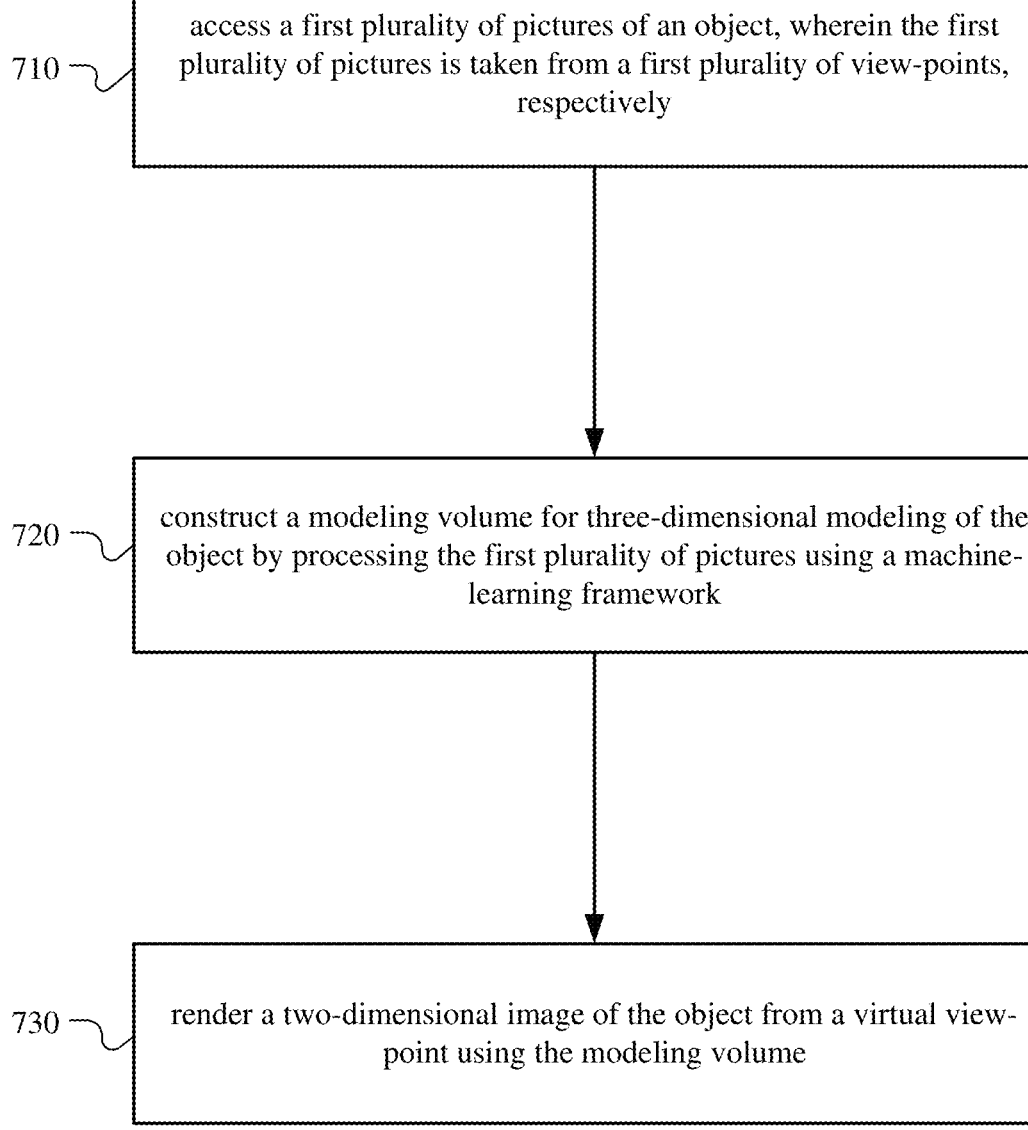
FIG. 7 illustrates an example method for constructing a three-dimensional modeling volume of an object to render a two-dimensional image of the object.

FIG. 7 illustrates an example method 700 for constructing a three-dimensional modeling volume of an object to render a two-dimensional image of the object. The method may begin at step 710, where a computing device may access a first plurality of pictures of an object. The first plurality of pictures may be taken from a first plurality of view-points, respectively. At step 720, the computing device may construct a modeling volume for three-dimensional modeling of the object by processing the first plurality of pictures using a machine-learning framework. The modeling volume may be associated with a plurality of color and opacity information that are associated with a plurality of regions in the modeling volume. At step 730, the computing device may render a two-dimensional image of the object from a virtual view-point using the modeling volume. The computing device may render each pixel of the image by determining a color and opacity of the pixel based the constructed modeling volume. The computing device may first project a virtual ray from the virtual view-point and through the modeling volume. The computing device may determine one or more of the plurality of regions in the modeling volume intersected by the virtual ray. The computing device may determine a color and an opacity of the pixel based on an accumulation of the color and opacity information associated with the one or more of the plurality of regions intersected by the virtual ray. Particular embodiments may repeat one or more steps of the method of FIG. 7, where appropriate. Although this disclosure describes and illustrates particular steps of the method of FIG. 7 as occurring in a particular order, this disclosure contemplates any suitable steps of the method of FIG. 7 occurring in any suitable order. Moreover, although this disclosure describes and illustrates an example method for constructing a three-dimensional modeling volume of an object to render a two-dimensional image of the object including the particular steps of the method of FIG. 7, this disclosure contemplates any suitable method for constructing a three-dimensional modeling volume of an object to render a two-dimensional image of the object including any suitable steps, which may include all, some, or none of the steps of the method of FIG. 7, where appropriate. Furthermore, although this disclosure describes and illustrates particular components, devices, or systems carrying out particular steps of the method of FIG. 7, this disclosure contemplates any suitable combination of any suitable components, devices, or systems carrying out any suitable steps of the method of FIG. 7.

Artificial Neural Networks

Figure 8:
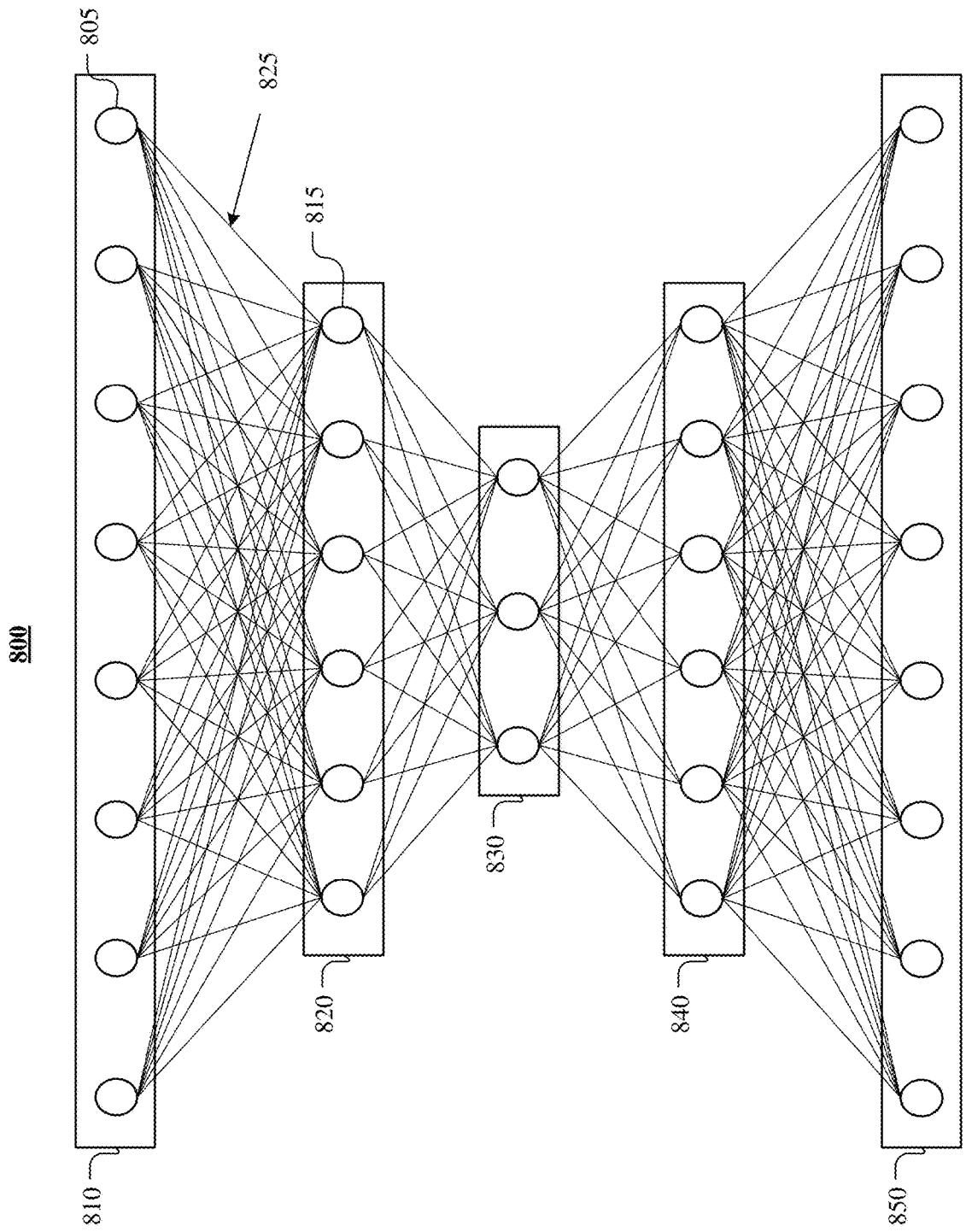
FIG. 8 illustrates an example artificial neural network.

FIG. 8 illustrates an example artificial neural network ("ANN") 800. In particular embodiments, an ANN may refer to a computational model comprising one or more nodes. Example ANN 800 may comprise an input layer 810, hidden layers 820, 830, 840, and an output layer 850. Each layer of the ANN 800 may comprise one or more nodes, such as a node 805 or a node 815. In particular embodiments, each node of an ANN may be connected to another node of the ANN. As an example and not by way of limitation, each node of the input layer 810 may be connected to one of more nodes of the hidden layer 820. In particular embodiments, one or more nodes may be a bias node (e.g., a node in a layer that is not connected to and does not receive input from any node in a previous layer). In particular embodiments, each node in each layer may be connected to one or more nodes of a previous or subsequent layer. Although FIG. 8 depicts a particular ANN with a particular number of layers, a particular number of nodes, and particular connections between nodes, this disclosure contemplates any suitable ANN with any suitable number of layers, any suitable number of nodes, and any suitable connections between nodes. As an example and not by way of limitation, although FIG. 8 depicts a connection between each node of the input layer 810 and each node of the hidden layer 820, one or more nodes of the input layer 810 may not be connected to one or more nodes of the hidden layer 820.

In particular embodiments, an ANN may be a feedforward ANN (e.g., an ANN with no cycles or loops where communication between nodes flows in one direction beginning with the input layer and proceeding to successive layers). As an example and not by way of limitation, the input to each node of the hidden layer 820 may comprise the output of one or more nodes of the input layer 810. As another example and not by way of limitation, the input to each node of the output layer 850 may comprise the output of one or more nodes of the hidden layer 840. In particular embodiments, an ANN may be a deep neural network (e.g., a neural network comprising at least two hidden layers). In particular embodiments, an ANN may be a deep residual network. A deep residual network may be a feedforward ANN comprising hidden layers organized into residual blocks. The input into each residual block after the first residual block may be a function of the output of the previous residual block and the input of the previous residual block. As an example and not by way of limitation, the input into residual block N may be F(x)+x, where F(x) may be the output of residual block N−1, x may be the input into residual block N−1. Although this disclosure describes a particular ANN, this disclosure contemplates any suitable ANN.

In particular embodiments, an activation function may correspond to each node of an ANN. An activation function of a node may define the output of a node for a given input. In particular embodiments, an input to a node may comprise a set of inputs. As an example and not by way of limitation, an activation function may be an identity function, a binary step function, a logistic function, or any other suitable function. As another example and not by way of limitation, an activation function for a node k may be the sigmoid function $$F_k(s_k) = \frac{1}{1 + e^{-s_k}},$$

the hyperbolic tangent function $$F_k(s_k) = \frac{e^{s_k} - e^{-s_k}}{e^{s_k} + e^{-s_k}},$$

the rectifier $F_k(s_k)=\max(0, s_k)$, or any other suitable function $F_k(s_k)$, where $s_k$ may be the effective input to node k. In particular embodiments, the input of an activation function corresponding to a node may be weighted. Each node may generate output using a corresponding activation function based on weighted inputs. In particular embodiments, each connection between nodes may be associated with a weight. As an example and not by way of limitation, a connection 825 between the node 805 and the node 815 may have a weighting coefficient of 0.4, which may indicate that 0.4 multiplied by the output of the node 805 is used as an input to the node 815. As another example and not by way of limitation, the output $y_k$ of node k may be $y_k=F_k(s_k)$, where $F_k$ may be the activation function corresponding to node k, $s_k=\Sigma_j(w_{jk}x_j)$ may be the effective input to node k, $x_j$ may be the output of a node j connected to node k, and $w_{jk}$ may be the weighting coefficient between node j and node k. In particular embodiments, the input to nodes of the input layer may be based on a vector representing an object. Although this disclosure describes particular inputs to and outputs of nodes, this disclosure contemplates any suitable inputs to and outputs of nodes. Moreover, although this disclosure may describe particular connections and weights between nodes, this disclosure contemplates any suitable connections and weights between nodes.

In particular embodiments, an ANN may be trained using training data. As an example and not by way of limitation, training data may comprise inputs to the ANN 800 and an expected output. As another example and not by way of limitation, training data may comprise vectors each representing a training object and an expected label for each training object. In particular embodiments, training an ANN may comprise modifying the weights associated with the connections between nodes of the ANN by optimizing an objective function. As an example and not by way of limitation, a training method may be used (e.g., the conjugate gradient method, the gradient descent method, the stochastic gradient descent) to backpropagate the sum-of-squares error measured as a distances between each vector representing a training object (e.g., using a cost function that minimizes the sum-of-squares error). In particular embodiments, an ANN may be trained using a dropout technique. As an example and not by way of limitation, one or more nodes may be temporarily omitted (e.g., receive no input and generate no output) while training. For each training object, one or more nodes of the ANN may have some probability of being omitted. The nodes that are omitted for a particular training object may be different than the nodes omitted for other training objects (e.g., the nodes may be temporarily omitted on an object-by-object basis). Although this disclosure describes training an ANN in a particular manner, this disclosure contemplates training an ANN in any suitable manner.

Systems and Methods

Figure 9:
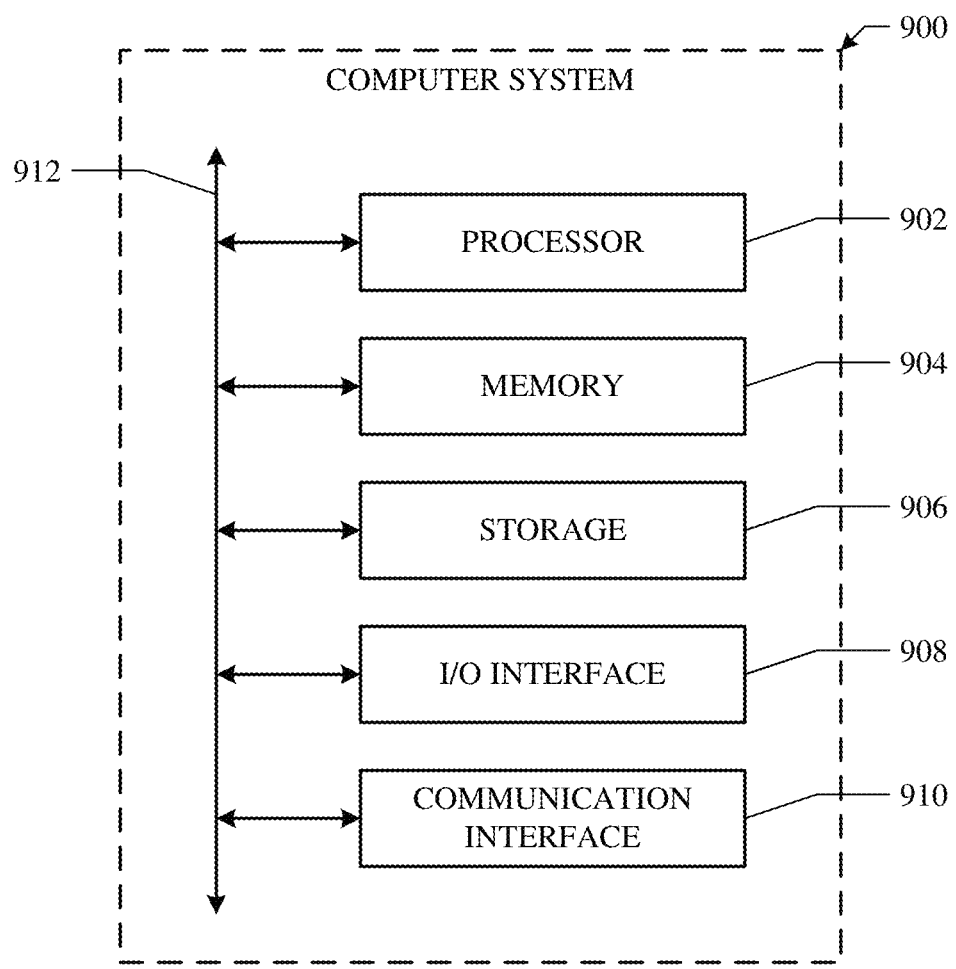
FIG. 9 illustrates an example computer system.

FIG. 9 illustrates an example computer system 900. In particular embodiments, one or more computer systems 900 perform one or more steps of one or more methods described or illustrated herein. In particular embodiments, one or more computer systems 900 provide functionality described or illustrated herein. In particular embodiments, software running on one or more computer systems 900 performs one or more steps of one or more methods described or illustrated herein or provides functionality described or illustrated herein. Particular embodiments include one or more portions of one or more computer systems 900. Herein, reference to a computer system may encompass a computing device, and vice versa, where appropriate. Moreover, reference to a computer system may encompass one or more computer systems, where appropriate.

This disclosure contemplates any suitable number of computer systems 900. This disclosure contemplates computer system 900 taking any suitable physical form. As example and not by way of limitation, computer system 900 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 900 may include one or more computer systems 900; be unitary or distributed; span multiple locations; span multiple machines; span multiple data centers; or reside in a cloud, which may include one or more cloud components in one or more networks. Where appropriate, one or more computer systems 900 may perform without substantial spatial or temporal limitation one or more steps of one or more methods described or illustrated herein. As an example and not by way of limitation, one or more computer systems 900 may perform in real time or in batch mode one or more steps of one or more methods described or illustrated herein. One or more computer systems 900 may perform at different times or at different locations one or more steps of one or more methods described or illustrated herein, where appropriate.

In particular embodiments, computer system 900 includes a processor 902, memory 904, storage 906, an input/output (I/O) interface 908, a communication interface 910, and a bus 912. Although this disclosure describes and illustrates a particular computer system having a particular number of particular components in a particular arrangement, this disclosure contemplates any suitable computer system having any suitable number of any suitable components in any suitable arrangement.

In particular embodiments, processor 902 includes hardware for executing instructions, such as those making up a computer program. As an example and not by way of limitation, to execute instructions, processor 902 may retrieve (or fetch) the instructions from an internal register, an internal cache, memory 904, or storage 906; decode and execute them; and then write one or more results to an internal register, an internal cache, memory 904, or storage 906. In particular embodiments, processor 902 may include one or more internal caches for data, instructions, or addresses. This disclosure contemplates processor 902 including any suitable number of any suitable internal caches, where appropriate. As an example and not by way of limitation, processor 902 may include one or more instruction caches, one or more data caches, and one or more translation lookaside buffers (TLBs). Instructions in the instruction caches may be copies of instructions in memory 904 or storage 906, and the instruction caches may speed up retrieval of those instructions by processor 902. Data in the data caches may be copies of data in memory 904 or storage 906 for instructions executing at processor 902 to operate on; the results of previous instructions executed at processor 902 for access by subsequent instructions executing at processor 902 or for writing to memory 904 or storage 906; or other suitable data. The data caches may speed up read or write operations by processor 902. The TLBs may speed up virtual-address translation for processor 902. In particular embodiments, processor 902 may include one or more internal registers for data, instructions, or addresses. This disclosure contemplates processor 902 including any suitable number of any suitable internal registers, where appropriate. Where appropriate, processor 902 may include one or more arithmetic logic units (ALUs); be a multi-core processor; or include one or more processors 902. Although this disclosure describes and illustrates a particular processor, this disclosure contemplates any suitable processor.

In particular embodiments, memory 904 includes main memory for storing instructions for processor 902 to execute or data for processor 902 to operate on. As an example and not by way of limitation, computer system 900 may load instructions from storage 906 or another source (such as, for example, another computer system 900) to memory 904. Processor 902 may then load the instructions from memory 904 to an internal register or internal cache. To execute the instructions, processor 902 may retrieve the instructions from the internal register or internal cache and decode them. During or after execution of the instructions, processor 902 may write one or more results (which may be intermediate or final results) to the internal register or internal cache. Processor 902 may then write one or more of those results to memory 904. In particular embodiments, processor 902 executes only instructions in one or more internal registers or internal caches or in memory 904 (as opposed to storage 906 or elsewhere) and operates only on data in one or more internal registers or internal caches or in memory 904 (as opposed to storage 906 or elsewhere). One or more memory buses (which may each include an address bus and a data bus) may couple processor 902 to memory 904. Bus 912 may include one or more memory buses, as described below. In particular embodiments, one or more memory management units (MMUs) reside between processor 902 and memory 904 and facilitate accesses to memory 904 requested by processor 902. In particular embodiments, memory 904 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 904 may include one or more memories 904, where appropriate. Although this disclosure describes and illustrates particular memory, this disclosure contemplates any suitable memory.

In particular embodiments, storage 906 includes mass storage for data or instructions. As an example and not by way of limitation, storage 906 may include a hard disk drive (HDD), a floppy disk drive, flash memory, an optical disc, a magneto-optical disc, magnetic tape, or a Universal Serial Bus (USB) drive or a combination of two or more of these. Storage 906 may include removable or non-removable (or fixed) media, where appropriate. Storage 906 may be internal or external to computer system 900, where appropriate. In particular embodiments, storage 906 is non-volatile, solid-state memory. In particular embodiments, storage 906 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 906 taking any suitable physical form. Storage 906 may include one or more storage control units facilitating communication between processor 902 and storage 906, where appropriate. Where appropriate, storage 906 may include one or more storages 906. Although this disclosure describes and illustrates particular storage, this disclosure contemplates any suitable storage.

In particular embodiments, I/O interface 908 includes hardware, software, or both, providing one or more interfaces for communication between computer system 900 and one or more I/O devices. Computer system 900 may include one or more of these I/O devices, where appropriate. One or more of these I/O devices may enable communication between a person and computer system 900. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 908 for them. Where appropriate, I/O interface 908 may include one or more device or software drivers enabling processor 902 to drive one or more of these I/O devices. I/O interface 908 may include one or more I/O interfaces 908, where appropriate. Although this disclosure describes and illustrates a particular I/O interface, this disclosure contemplates any suitable I/O interface.

In particular embodiments, communication interface 910 includes hardware, software, or both providing one or more interfaces for communication (such as, for example, packet-based communication) between computer system 900 and one or more other computer systems 900 or one or more networks. As an example and not by way of limitation, communication interface 910 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 910 for it. As an example and not by way of limitation, computer system 900 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 900 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 900 may include any suitable communication interface 910 for any of these networks, where appropriate. Communication interface 910 may include one or more communication interfaces 910, where appropriate. Although this disclosure describes and illustrates a particular communication interface, this disclosure contemplates any suitable communication interface.

In particular embodiments, bus 912 includes hardware, software, or both coupling components of computer system 900 to each other. As an example and not by way of limitation, bus 912 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 912 may include one or more buses 912, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

MISCELLANEOUS

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising:
    accessing, by one or more computing devices, a first plurality of pictures of an object in a first state, wherein the first plurality of pictures is taken from a first plurality of view-points, respectively;
    constructing, by the one or more computing devices, an encoding vector by processing the first plurality of pictures of the object using an encoder of a machine-learning framework, the encoding vector representing the object in the first state;
    modifying, by the one or more computing devices, the encoding vector to represent the object in a second state;
    constructing, by the one or more computing devices, a modeling volume for three-dimensional modeling of the object in the second state by processing the modified encoding vector using a decoder of the machine-learning framework, wherein the modeling volume is associated with a plurality of color and opacity information that are associated with a plurality of regions in the modeling volume; and
    rendering, by the one or more computing devices, a two-dimensional image of the object from a virtual view-point using the modeling volume, wherein each pixel of the image is rendered by:
        projecting a virtual ray from the virtual view-point and through the modeling volume;
        determining one or more of the plurality of regions in the modeling volume intersected by the virtual ray; and
        determining a color and an opacity of the pixel based on an accumulation of the color and opacity information associated with the one or more of the plurality of regions intersected by the virtual ray.

2. The method of claim 1, wherein linearly interpolating a first encoding vector for the object in a third state and a second encoding vector for the object in a fourth state causes generating a modeling volume for modeling the object in a fifth state, wherein the fifth state is in between the third state and the fourth state.

3. The method of claim 1, wherein the encoder is a convolutional neural network.

4. The method of claim 1, wherein the decoder is a convolutional decoder.

5. The method of claim 1, wherein the decoder is a linear basis decoder.

6. The method of claim 1, wherein the machine-learning framework is trained based on steps comprising:

accessing a second plurality of pictures of the object, wherein the second plurality of pictures is taken from a second plurality of view-points, respectively; and training the machine-learning framework by repeating following steps until a pre-determined condition is met:

constructing a second modeling volume for three-dimensional spatial modeling of the object by processing the second plurality of pictures using the machine-learning framework;

rendering a plurality of two-dimensional images of the object from a plurality of virtual view-points corresponding to the second plurality of view-points; and updating the machine-learning framework based on comparisons between the plurality of two-dimensional images and the second plurality of pictures.

7. The method of claim 6, wherein the first plurality of view-points is a subset of the second plurality of view-points.

8. The method of claim 6, wherein updating the machine-learning framework based on comparisons between the plurality of two-dimensional images and the second plurality of pictures comprises:

calculating, for each of the rendered plurality of two-dimensional images from a virtual view-point and a picture taken from a corresponding view-point among the second plurality of pictures, a pre-determined loss function based on comparisons between the rendered image and the corresponding picture; and adjusting parameters of the machine-learning framework by performing backpropagation based on the calculated loss functions.

9. The method of claim 6, wherein one or more sets of pictures of the object taken from the second plurality of view-points are used for training, wherein each of the one or more sets corresponds to a time instance.

10. The method of claim 9, wherein a background per each of the second plurality of view-points is static across the time instances.

11. The method of claim 1, wherein the accumulation of the color and opacity information associated with the one or more regions intersected by the virtual ray comprises accumulating opacity weighted color associated with the one or more regions until an accumulated opacity associated with the one or more regions reaches a threshold.

12. The method of claim 1, wherein a region in the modeling volume is represented by a voxel comprising information for color and opacity of the region.

13. The method of claim 12, wherein a color of a region is represented by RGB color codes, and wherein an opacity of a region is represented by a scalar value between 0 and 1.

14. The method of claim 1, wherein the modeling volume is represented by a three-dimensional warp volume and a three-dimensional information volume, wherein each region in the warp volume points to a region in the information volume, and wherein each region in the information volume is associated with information for color and opacity.

15. The method of claim 14, wherein information for color and opacity of a first region in the modeling volume is accessed from a second region in the information volume that is pointed by a third region in the warp volume, wherein the third region in the warp volume corresponds to the first region in the modeling volume.

16. One or more computer-readable non-transitory storage media embodying software that is operable when executed to:

access a first plurality of pictures of an object in a first state, wherein the first plurality of pictures is taken from a first plurality of view-points, respectively;

construct an encoding vector by processing the first plurality of pictures of the object using an encoder of a machine-learning framework, the encoding vector representing the object in the first state, modify the encoding vector to represent the object in a second state;

construct a modeling volume for three-dimensional modeling of the object in the second state by processing the modified encoding vector using a decoder of the machine-learning framework, wherein the modeling volume is associated with a plurality of color and opacity information that are associated with a plurality of regions in the modeling volume; and render a two-dimensional image of the object from a virtual view-point using the modeling volume, wherein each pixel of the image is rendered by:

project a virtual ray from the virtual view-point and through the modeling volume;

determine one or more of the plurality of regions in the modeling volume intersected by the virtual ray; and determine a color and an opacity of the pixel based on an accumulation of the color and opacity information associated with the one or more of the plurality of regions intersected by the virtual ray.

17. A system comprising: one or more processors; and a non-transitory memory coupled to the processors comprising instructions executable by the processors, the processors operable when executing the instructions to:

access a first plurality of pictures of an object in a first state, wherein the first plurality of pictures is taken from a first plurality of view-points, respectively;

construct an encoding vector by processing the first plurality of pictures of the object using an encoder of a machine-learning framework, the encoding vector representing the object in the first state, modify the encoding vector to represent the object in a second state;

construct a modeling volume for three-dimensional modeling of the object in the second state by processing the modified encoding vector using a decoder of the machine-learning framework, wherein the modeling volume is associated with a plurality of color and opacity information that are associated with a plurality of regions in the modeling volume; and render a two-dimensional image of the object from a virtual view-point using the modeling volume, wherein each pixel of the image is rendered by:

project a virtual ray from the virtual view-point and through the modeling volume;

determine one or more of the plurality of regions in the modeling volume intersected by the virtual ray; and determine a color and an opacity of the pixel based on an accumulation of the color and opacity information associated with the one or more of the plurality of regions intersected by the virtual ray.

\* \* \* \* \*